US008516821B2

(12) United States Patent
Maeding

(10) Patent No.: US 8,516,821 B2
(45) Date of Patent: Aug. 27, 2013

(54) INJECTION ELEMENT

(75) Inventor: Chris Udo Maeding, Unterschleissheim (DE)

(73) Assignee: Eads Space Transportation GmbH, Bremen (DE)

(*) Notice: Subject to any disclaimer, the term of this patent is extended or adjusted under 35 U.S.C. 154(b) by 1354 days.

(21) Appl. No.: 10/579,201

(22) PCT Filed: Nov. 3, 2004

(86) PCT No.: PCT/DE2004/002430
§ 371 (c)(1),
(2), (4) Date: May 12, 2006

(87) PCT Pub. No.: WO2005/049998
PCT Pub. Date: Jun. 2, 2005

(65) Prior Publication Data
US 2007/0089397 A1   Apr. 26, 2007

(30) Foreign Application Priority Data
Nov. 15, 2003 (DE) .................................. 103 53 423

(51) Int. Cl.
*F23R 3/36* (2006.01)
(52) U.S. Cl.
USPC .............................. 60/743; 60/742; 239/424
(58) Field of Classification Search
USPC ........... 60/737, 743, 742, 740, 748; 239/418, 239/421, 422, 423, 424, 424.5, 425, 434, 239/5
See application file for complete search history.

(56) References Cited

U.S. PATENT DOCUMENTS

| 3,439,502 A | 4/1969 | Lee |
| 3,439,503 A | 4/1969 | Friedman et al. |
| 3,459,001 A | 8/1969 | Munding |
| 3,498,059 A | 3/1970 | Gradon et al. |
| 3,675,425 A | 7/1972 | Scannell et al. |
| 3,703,259 A * | 11/1972 | Sturgess et al. ............... 239/400 |
| 3,866,413 A * | 2/1975 | Sturgess ........................ 60/742 |
| 3,913,314 A * | 10/1975 | Yannone et al. ................ 60/790 |
| 4,916,896 A * | 4/1990 | Paul .............................. 60/244 |
| 5,113,647 A * | 5/1992 | Shekleton ...................... 60/804 |
| 5,172,548 A | 12/1992 | Dubedout et al. |
| 5,673,554 A * | 10/1997 | DeFreitas et al. .......... 60/39.821 |
| 6,101,814 A * | 8/2000 | Hoke et al. ...................... 60/752 |
| 6,397,580 B1 | 6/2002 | Stechman et al. |
| 6,893,255 B2 * | 5/2005 | Grob et al. ..................... 431/284 |
| 6,942,121 B1 * | 9/2005 | Northup et al. ............... 220/714 |
| 2003/0074886 A1 | 4/2003 | Stechman et al. |

FOREIGN PATENT DOCUMENTS

| DE | 4305154 | 5/1994 |
| DE | 19515879 | 6/1996 |
| DE | 10130355 | 1/2003 |

* cited by examiner

*Primary Examiner* — Andrew Nguyen
(74) *Attorney, Agent, or Firm* — Greenblum & Bernstein, P.L.C.

(57) ABSTRACT

The invention relates to an injection element having an inner element with a first outlet opening and an outer element. The outer element includes at least one second outlet opening structured and arranged for receiving and injecting fuel in a combustion space, and arranged coaxially to the first outlet opening. The outer element further includes third outlet openings composed of bores structured and arranged for forming a cooling liquid film layer, wherein the bores are arranged coaxially to the first outlet opening and the at least one second outlet opening.

17 Claims, 4 Drawing Sheets

INJECTION ELEMENT

CROSS REFERENCE TO RELATED APPLICATIONS

The present application is a National Stage Application of International Application No. PCT/DE2004/002430 filed Nov. 3, 2004, which published as WO 2005/049998 A1 on Jun. 2, 2005, the disclosure of which is expressly incorporated by reference herein in its entirety. Further, the present application claims priority under 35 U.S.C. §119 and §365 of German Application No. 103 53 423.7 filed Nov. 15, 2003.

BACKGROUND OF THE INVENTION

1. Field of the Invention

The invention relates to an injection element, in particular for a rocket drive, with an inner element with a first outlet opening and an outer element arranged coaxially thereto with at least one second outlet opening arranged coaxially to the first outlet opening for receiving and injecting fuel in a combustion space.

2. Background Description

Injection elements are used in a rocket drive for the mixture preparation and for ensuring an optimal combustion in a combustion space of the rocket drive.

An injection element in coaxial construction for operation with two hypergolically reacting fuels is known, e.g., from DE 43 05 154 C1. With this injection element, the combustion fuel flow fed separately to the combustion chamber is divided by means of a flow divider provided with bores, into several individual flows distributed over the circumference of the feed channel. This is to render possible a stable combustion without relevant pressure fluctuations.

Furthermore, an injection element is known from DE 101 30 355 A1 in which a fuel flow fed to a combustion chamber is divided and the two partial flows thus produced are injected into the combustion chamber in a separated manner. The injection hereby occurs in the form of two hollow cone flows coaxial to one another. An optimal droplet preparation with different droplet size in the two hollow cone flows can thus be achieved, which render possible special combustion zones with different combustion behavior or a gradual combustion of the fuel.

DE 195 15 879 C1 describes an injection element in bicoaxial construction, i.e., the injection element comprises an inner element with a first outlet opening to form a conical oxidant jet and an outer element arranged coaxially thereto with further second outlet openings in the form of passage channels to form fuel jets.

In many cases it is necessary to create a zone for cooling an area of the combustion chamber close to the wall. In order to achieve this, in part the integration is resorted to of additional injection elements embodied especially for this purpose. These can be on the one hand elements with liquid swirl and on the other hand also simple elements with bores.

SUMMARY OF THE INVENTION

The aim of the present invention is now to create an injection element, in particular for a rocket drive, which at the same time renders possible the formation of a cooling liquid film layer for the injection of fuel in a combustion space.

According to the invention, the injection element includes an outer element having third outlet openings in the form of bores for forming a cooling liquid film layer. The bores are arranged coaxially to the first and second outlet openings. The invention is also directed to an injection element having an inner element with third outlet openings in the form of bores for forming a cooling liquid film layer. The bores are arranged coaxially to the first and second outlet openings.

One important concept of the invention lies in providing bores in an inner or an outer element of the injection element, which bores are used to separate the fuel necessary for a cooling liquid film layer. The advantage of such an injection element is that elements already present of conventional injection elements are used to create a fuel-rich or oxidizer-rich zone. Furthermore, only one element is required to form a cooling film area, and additional elements are not necessary. In addition, there is the possibility of creating two zones in the combustion space with the injection element according to the invention. Furthermore, a gradual reaction (combustion) can be achieved with the invention. Finally, the invention is suitable for use in a wide operating range with regard to a mixing ratio of fuel.

The invention now relates to an injection element, in particular for a rocket drive, with an inner element with a first outlet opening and an outer element arranged coaxially thereto with at least one second outlet opening arranged coaxially to the first outlet opening for receiving and injecting fuel in a combustion space. According to the invention, the outer element has in addition third outlet openings in the form of bores for forming a cooling liquid film layer, which bores are arranged coaxially to the first and second outlet openings.

In particular, the outer element can have a swirler space for impressing a swirl in the fed fuel flow, in which the bores are provided. In this case, fuel for forming the cooling liquid film layer is split off via the bores in the swirler space. Swirlers are known, e.g., from DE 101 30 355 A1 already mentioned at the outset and are also referred to there as a swirl insert.

Preferably the bores are provided in a tapering area of the swirler space. The bores can thus receive fuel particularly efficiently.

The bores can be arranged in the outer element such that the influence of the cooling liquid film layer formed through the bores on the fuel injecting into the combustion space is as slight as possible. In other words, the bores can be aligned such that the cooling liquid film layer and the fuel injecting into the combustion space just after entry into the combustion space do not touch one another or mix.

The bores can change over into an annular gap to generate a swirl. In this case a cooling liquid film layer is formed with a swirl, which can have an advantageous effect on the formation of an optimal mixture in the combustion space.

The invention further relates to an injection element, in particular for a rocket drive, with an inner element with a first outlet opening and an outer element arranged coaxially thereto with at least one second outlet opening arranged coaxially to the first outlet opening for receiving and injecting fuel into a combustion space, in which according to the invention the inner element has third outlet openings in the form of bores for forming a cooling liquid film layer, which bores are arranged coaxially to the first and second outlet openings.

With this type of injection element, a partial premixing takes place that is of major importance for an optimal combustion, particularly in the case of elements with hollow cones of injected fuel that do not overlap.

With the two types of injection elements explained above, according to the invention the bores can be distributed in particularly uniformly over the entire circumference of the outer or of the inner element. A conical cooling liquid film is thus created. This is expedient in particular with drives with only one injection element (single-element chambers). With such drives the conical liquid film then serves to cool the inner wall of the combustion space and avoids an enrichment of excess fuel during the phase of the ignition in the area of the combustion space close to the wall. This is very important, particularly with short-term operations, and greatly reduces the danger of the deposit of too much residue such as, e.g., soot on the inner wall of the combustion chamber. As already mentioned, a two-zone combustion can be created above all by only one injection element.

In particular when several injection elements are used, it is more advantageous if the bores are distributed in particular uniformly over only a part of the circumference of the outer or inner element. Preferably the bores should then be arranged in the part of the circumference that lies adjacent to the inner wall of the combustion space so that the liquid film layer exiting from the bores sprays in the direction of the inner wall.

With a preferred embodiment with simple bores for feeding a component, the bores are preferably aligned such that fuel jets exiting from them are mixed with the component jets leaving the components feed bores. A premixing of fuel and component thus occurs through which a droplet formation already takes place early. This has an advantageous effect in the main mixing with a hollow cone of a swirler element.

Finally the invention relates to the use in a rocket engine that has a combustion space. The rocket engine is characterized in that it has at least one injection element according to the invention.

In particular the at least one injection element according to the invention is arranged with the rocket engine such that the cooling liquid film layer exiting from it is directed at least in part towards the combustion space inner wall.

BRIEF DESCRIPTION OF THE DRAWINGS

Further advantages and application possibilities of the present invention are revealed by the following description in connection with the exemplary embodiments shown in the drawings.

The terms used in the list of reference numbers at the end and the reference numbers assigned thereto are used in the specification, in the claims, in the abstract and in the drawings. The drawings show:

The same and functionally the same elements can be provided with the same reference numbers below.

DETAILED DESCRIPTION OF THE INVENTION

Figure 1A:
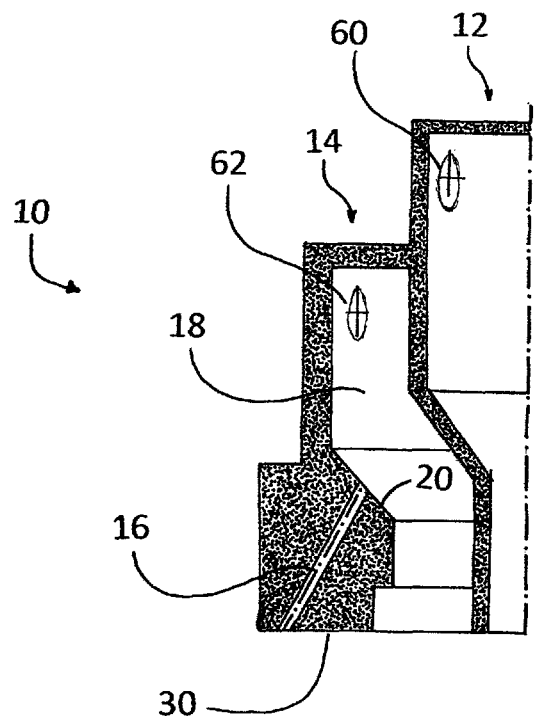
FIG. 1A A first exemplary embodiment of an injection element according to the invention in cross section.

FIG. 1A shows in cross-sectional representation an injection element 10 with an inner element 12 and an outer element 14. Inner and outer element 12 or 14 are arranged coaxially to one another. Both elements receive fuel under high pressure, which fuel is injected through each element respectively in the form of a hollow cone into a combustion space (not shown) of a rocket drive. The fuel is injected via feed bores 60 and 62 into the inner or outer element 12 or 14. Moreover, the outer element 14 has a swirler space 18 in order to give the fuel a swirl.

Figures 2A, 2B:
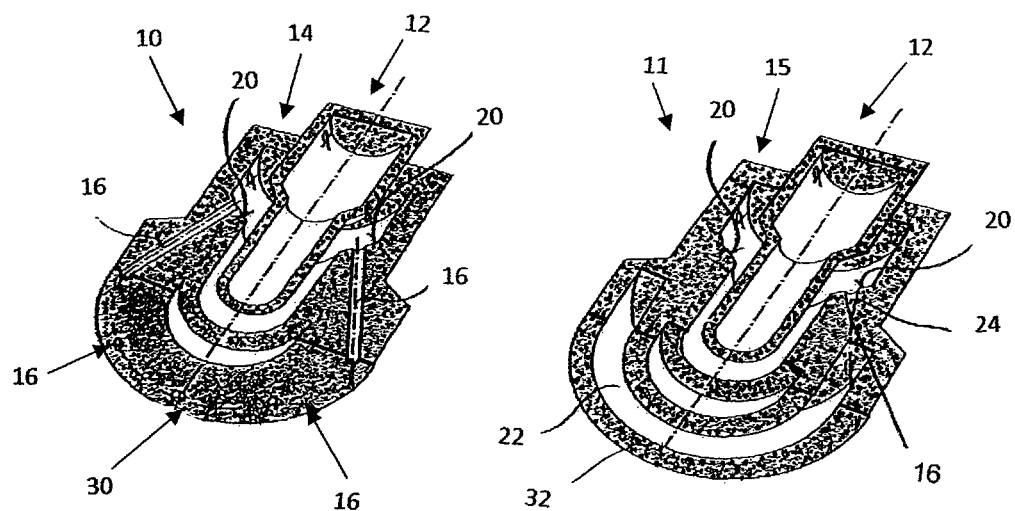
FIG. 2A A third exemplary embodiment of an injection element according to the invention in perspective cross section.
FIG. 2B A fourth exemplary embodiment of an injection element according to the invention in perspective cross section.

FIG. 2A shows the injection element 10 from FIG. 1A in a perspective cross-sectional representation. Here the front face 30 of the injection element 10 can be seen clearly from which the fuel exits and is injected into the combustion space.

The outer element 14 has several bores 16 in its outer wall, which bores begin in the tapering area 20 of the swirler space 18 and end in the front face 30 facing the combustion space. The bores 16 receive the fuel located in the swirler space 18 and feed the received fuel to the combustion space in the form of another hollow cone. The bores 16 are aligned such that the fuel sprays into the combustion space in the form of a hollow cone that opens in the direction of the inner wall of the combustion space in order to cool the inner wall.

Figure 1B:
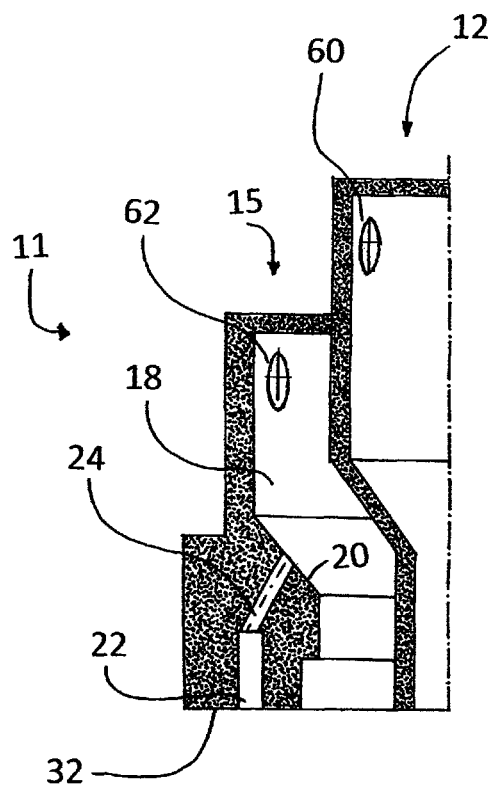
FIG. 1B A second exemplary embodiment of an injection element according to the invention in cross section.

FIG. 1B shows another injection element 11 in cross section, which element is essentially similar to the injection element 10 of FIG. 1A, in which, however, inclined bores 24 are provided in the outer element 15, which bores end in an annular gap 22 of the outer element 15. With this exemplary embodiment the fuel is injected via the annular gap 22 with a swirl into the combustion space. To this end the bores 24 are inclined in two levels. FIG. 2B shows this exemplary embodiment in a perspective cross-sectional view. Through the inclination of the bores 24, the fuel is already injected into the annular gap 22 with a swirl.

Figures 2C, 2D:
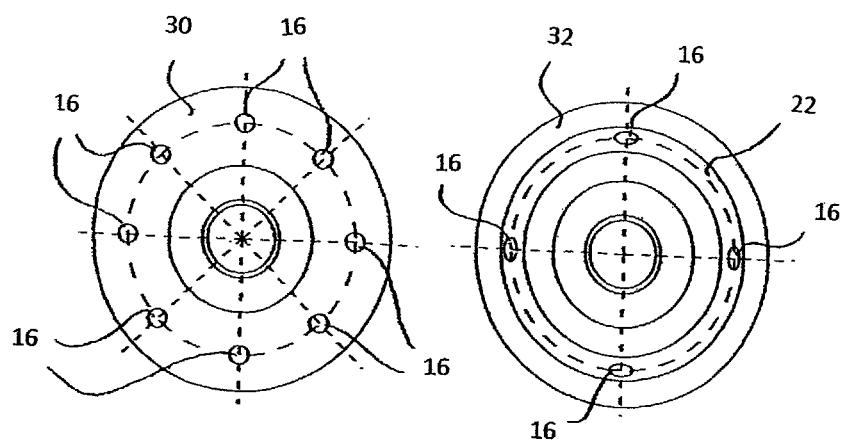
FIG. 2C The front face of the injection element shown in FIG. 2A in plan view.
FIG. 2D The front face of the injection element shown in FIG. 2B in plan view.

FIGS. 2C and 2D show the front faces 30 and 32 of the two exemplary embodiments of the injection elements 10 or 11 shown in FIG. 1A, 2A or 1B, 2B. With the first exemplary embodiment 10 in FIG. 2C a total of eight bores 16 are uniformly distributed over the circumference of the front face 30, i.e., the bores 16 are equally distanced from one another. With the second exemplary embodiment 11 in FIG. 2D four bores 16 distributed uniformly over the circumference of the front face 32 discharge into the annular gap 22. Both injection elements 10 and 11 are suitable as single elements for a combustion space or a combustion chamber.

Figure 3:
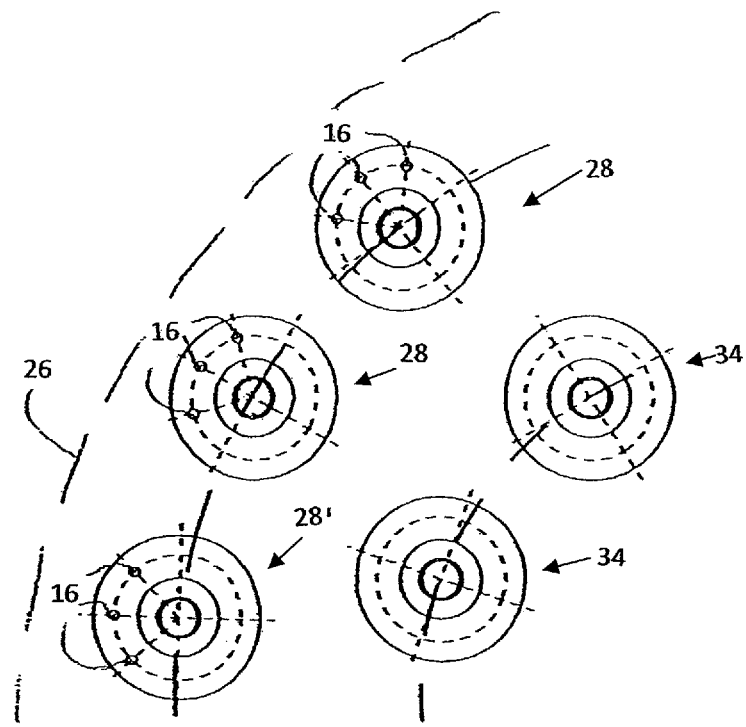
FIG. 3 An arrangement of several injection elements in the combustion space of a rocket engine.

FIG. 3 shows the arrangement of several injection elements 28 and 34 in a combustion chamber of a rocket engine. The injection elements labeled 34 are conventional injection elements that serve only to inject fuel into the combustion space. Although the injection elements 28 according to the invention likewise serve to inject fuel, at the same time they serve to form a liquid film layer cooling the combustion space inner wall 26. They differ from the exemplary embodiments 10 and 11 explained above in that bores 16 are provided only on the part of the circumference of the front face of these injection elements 28 that is arranged directly adjacent to the combustion space inner wall 26, i.e., in the area of the circumference of the front face close to the wall. Fuel is thus sprayed from the bores 16 in the direction of the combustion space inner wall in order to cool it. This exemplary embodiment is suitable for engines with several injection elements as shown.

Inhomogeneities can be influenced or correspondingly oriented through a corresponding remaining run length of the swirler space.

Figure 4:
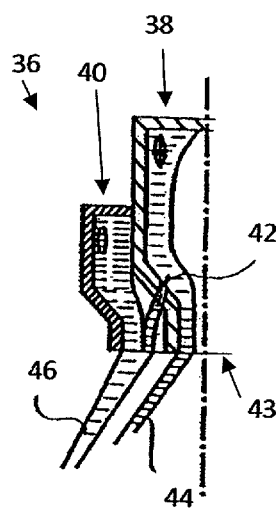
FIG. 4 A fifth exemplary embodiment of an injection element according to the invention in cross section.

FIG. 4 shows in cross section another exemplary embodiment of an injection element 36 that has an inner element 38 and an outer element 40 arranged coaxially thereto. In this exemplary embodiment bores 42 are provided in the inner element 38, which bores end at the front face 43. The bores 42 are aligned such that the fuel thus split off from the inner element 38 mixes with the fuel injected into the combustion space through the outer element 40 (fuel hollow cone 46). Through this a partial premixing takes place which has an advantageous effect in particular with elements that form non-overlapping fuel hollow cones 44 and 46 as in the exemplary embodiment shown.

Figure 5:
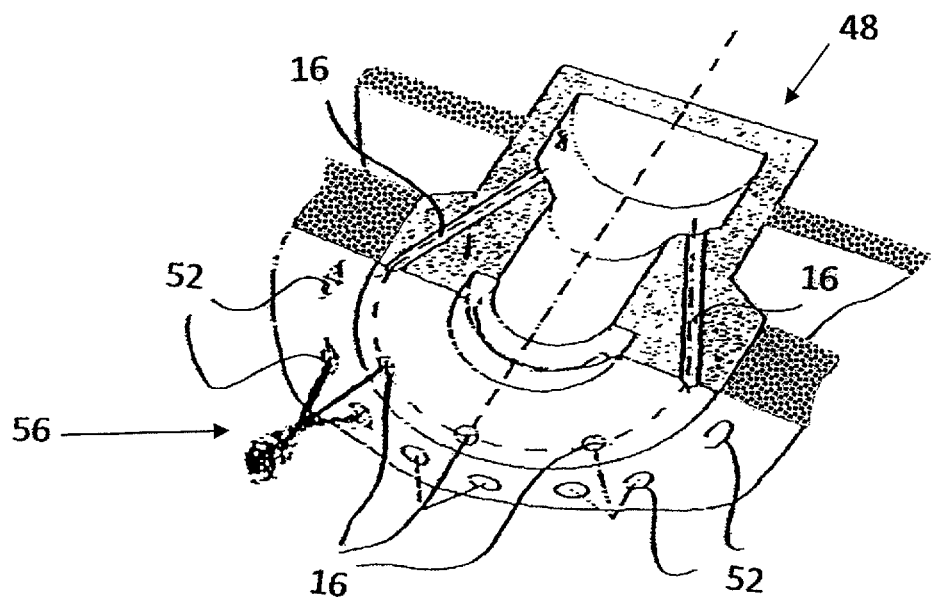
FIG. 5 A sixth exemplary embodiment of an injection element according to the invention in perspective cross section.
Figure 6:
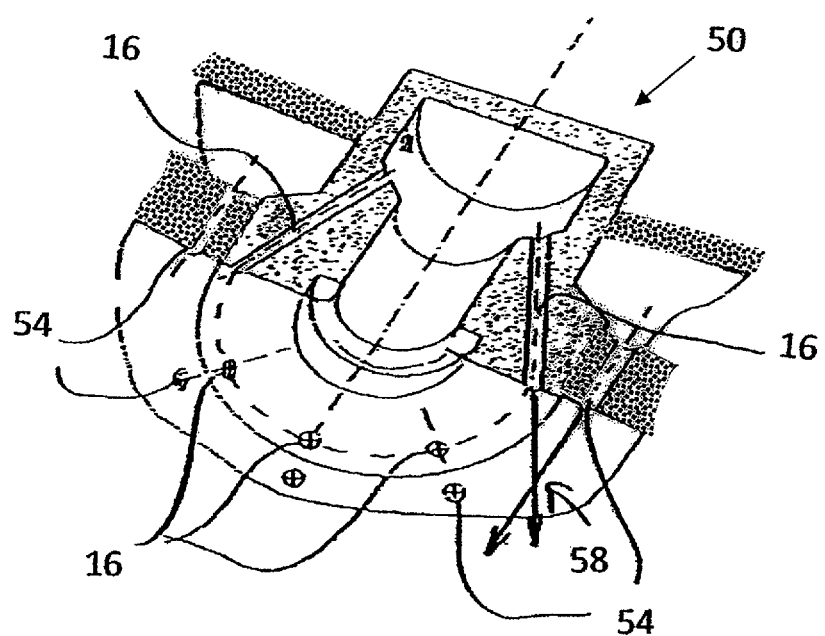
FIG. 6 A seventh exemplary embodiment of an injection element according to the invention in perspective cross section.

FIGS. 5 and 6 finally show injection elements 48 and 50 that are provided with component feeds, more precisely with bores 52 or 54 for feeding a component. FIG. 5 shows an "unlike triplet" in which three liquid jets intersect (at reference number 56). In contrast FIG. 6 shows an "unlike doublet" in which two liquid jets intersect (at reference number 58). Through the "intersection" of the jets a pre-mixing occurs and thus a droplet formation, which has a favorable effect on the main mixing with the hollow cone of the swirler element.

LIST OF REFERENCE NUMBERS

10 Injection element
11 Injection element
12 Inner element
14 Outer element
15 Outer element
16 Bore
18 Swirler space
20 Tapering area of the swirler space 18
22 Annular gap
24 Inclined bore
26 Combustion space inner wall
28 Injection element
30 Front face of the injection element 10
32 Front face of the injection element 11
34 Injection element
36 Injection element
38 Inner element
40 Outer element
42 Bores
44 Inner fuel hollow cone
46 Outer fuel hollow cone
48 Injection element
50 Injection element
52 Bores for feeding a component
54 Bores for feeding a component
56 Intersection of three liquid jets
58 Intersection of two liquid jets
60 Feed bore for fuel
62 Feed bore for fuel

The invention claimed is:

1. A combustion device comprising:
an injection element, the injection element comprising:
a front face surface;
an inner element forming a first passage in fluid communication with a first source of fuel and having a first outlet opening;
an outer element forming a second passage in fluid communication with a second source of fuel, comprising:
at least one second outlet opening receiving a first portion of the fuel from the second passage and injecting fuel into a combustion space, and arranged coaxially to the first outlet opening; and
third outlet openings receiving the remaining portion of the fuel from the second passage and positioned radially beyond the at least one second outlet opening composed of bores forming a cooling liquid film layer on an inner wall of the combustion space downstream of the injection element, wherein the bores are arranged along a ring, which is coaxial to the first outlet opening and the at least one second outlet opening, and the bores are structured and arranged to supply the cooling liquid film layer in an outwardly-directed direction relative to a longitudinal axis of the first outlet opening upon exiting the injection element,
wherein at least two of the first outlet opening, the at least one second outlet opening and the third outlet openings are arranged on the front face surface,
wherein the injection element is a rocket drive injection element, and
wherein the bores open to the combustion space.

2. The combustion device according to claim 1, wherein the outer element further comprises a swirler space in which the bores are located.

3. The combustion device according to claim 2, wherein the swirler space comprises a tapering area in which the bores are located.

4. The combustion device according to claim 2, wherein the bores are arranged and aligned in the outer element such that the cooling liquid film layer and the fuel injected into the combustion space do not touch one another or mix just after entry into the combustion space.

5. The combustion device according to claim 1, wherein the outer element further comprises an annular gap, and wherein the bores connect with the annular gap to generate a swirl.

6. The combustion device according to claim 1, wherein the bores are uniformly distributed over an entire circumference of the outer element.

7. The combustion device according to claim 1, wherein the bores are uniformly distributed over a portion of an entire circumference of the outer element.

8. The combustion device according to claim 1, wherein the outer element is arranged coaxially with the inner element.

9. The combustion device according to claim 1, wherein each of the first outlet opening, the at least one second outlet opening and the third outlet openings are arranged on the front face surface.

10. A combustion device comprising:
an injection element, comprising:
a front face surface;
an inner element forming a first passage in fluid communication with a first source of fuel and comprising a first outlet opening that receives a first portion of fuel from the first passage;
an outer element forming a second passage in fluid communication with a second source of fuel and having at least one second outlet opening for receiving and injecting fuel into a combustion space, and arranged coaxially to the first outlet opening;
the inner element further comprising third outlet openings receiving the remaining portion of fuel from the first passage and composed of bores forming a cooling liquid film layer on an inner wall of the combustion space downstream of the injection element, wherein the bores are arranged along a ring, which is coaxial to the first outlet opening and the at least one second outlet opening to surround the first outlet opening, and the bores are structured and arranged to supply the cooling liquid film layer in an outwardly-directed direction relative to a longitudinal axis of the first outlet opening upon exiting the injection element, wherein at least two of the first outlet opening, the at least one second outlet opening and the third outlet openings are arranged on the front face surface, wherein the injection element is a rocket drive injection element, and wherein the bores open to the combustion space.

11. The combustion device according to claim 10, wherein the bores are uniformly distributed over an entire circumference of the inner element.

12. The combustion device according to claim 10, wherein the bores are uniformly distributed over a portion of an entire circumference of the inner element.

13. The combustion device according to claim 10, wherein the at least one second outlet opening comprises component feed bores, wherein the bores and the component feed bores are arranged such that liquid jets exiting from the bores mix with liquid jets exiting from the component feed bores.

14. The combustion device according to claim 10, wherein the outer element is arranged coaxially with the inner element.

15. The combustion device according to claim 10, wherein each of the first outlet opening, the at least one second outlet opening and the third outlet openings are arranged on the front face surface.

16. A method of injecting fuel from an injection element into a combustion chamber comprising:

guiding fuel into the combustion chamber through a first passage formed by an inner element of the injection element and out of a first outlet opening;

guiding fuel into the combustion chamber through a second passage formed by an outer element of the injection element and out of a second outlet opening of the injection element arranged coaxially with the first outlet opening; and forming a cooling liquid film layer on an inner wall of a combustion space downstream of the injection element in the combustion chamber through bores arranged along a ring to coaxially surround the first outlet opening, and structured and arranged to supply the cooling liquid film layer in an outwardly-directed direction relative to a longitudinal axis of the first outlet opening upon exiting the injection element, wherein the bores are supplied with fuel from one of the first passage or the second passage upstream of the first outlet and the second outlet.

17. The method of claim 16, wherein the bores are arranged to coaxially surround the second outlet opening.

* * * * *